United States Patent [19]

Stapleton

[11] Patent Number: 5,126,951
[45] Date of Patent: Jun. 30, 1992

[54] SIMPLIFIED MENU INPUTTING FOR A PEN PLOTTER

[75] Inventor: Jeff T. Stapleton, Huntington Beach, Calif.

[73] Assignee: Calcomp, Inc., Anaheim, Calif.

[21] Appl. No.: 706,217

[22] Filed: May 28, 1991

[51] Int. Cl.⁵ .............................. G06K 15/00
[52] U.S. Cl. ..................... 395/103; 364/929.3; 364/DIG. 2
[58] Field of Search ............... 364/518-520, 364/235 MS, 237.7 MS, 927.6 MS, 929.3 MS, 930 MS; 358/75, 400, 403, 296; 346/154, 140 R, 139 R

[56] References Cited

U.S. PATENT DOCUMENTS 4,817,034 3/1989 Hardin, Sr. et al .......... 364/927.6
4,882,622 11/1989 Uzuda et al ................. 358/75

Primary Examiner—Arthur G. Evans

[57] ABSTRACT

This invention is directed to simplified menu display and inputting apparatus for use in a pen plotter having a set of up, down, left, and right control buttons used for pen control. There is an alpha-numeric display for displaying menu choices, an ON LINE button for placing the plotter in an on line mode of operation wherein the pen control buttons are employed in their normal manner, and a MENU button for placing the plotter in a menu input mode wherein the pen control buttons are employed to move from top to bottom through top level menu definitions and from left to right through subfunction menu definitions. Displayed menu choices are selected for insertion into a current parameter value list while in the menu input mode. Provision is made to identify a number of users and store their operating parameters separately and individually so that users can return and use the plotter with their values without having to re-enter them each time.

6 Claims, 2 Drawing Sheets

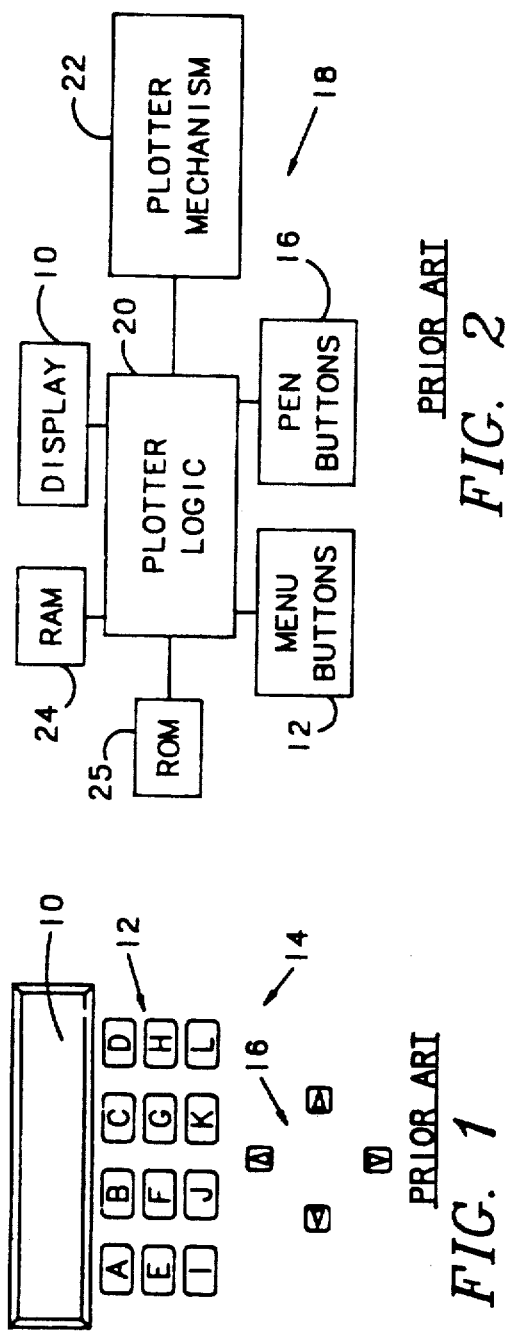
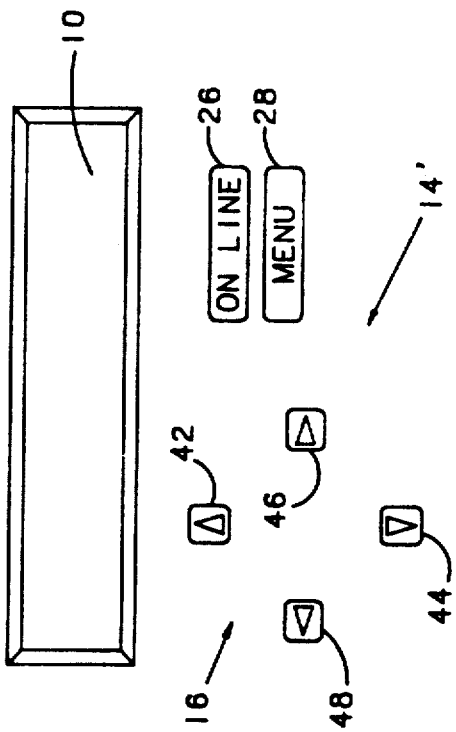
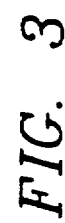
FIG. 1 PRIOR ART
FIG. 2 PRIOR ART
FIG. 3

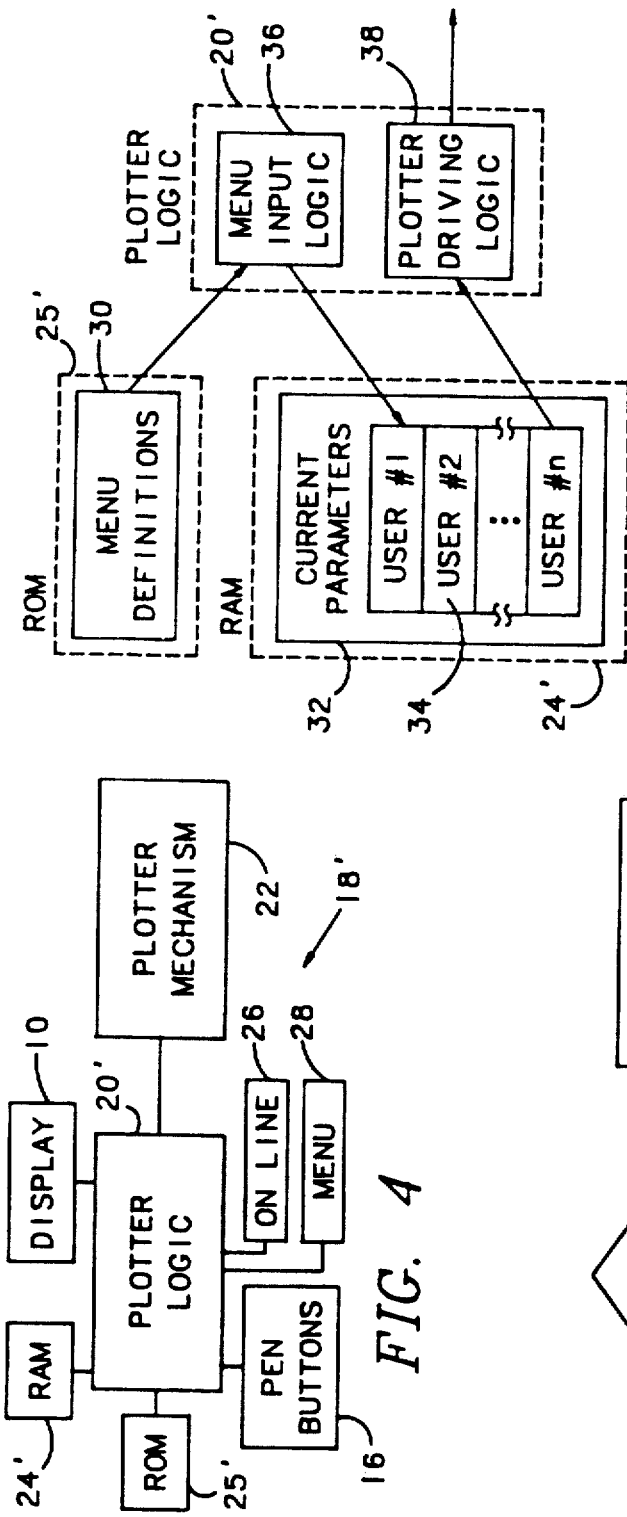
FIG. 5
FIG. 4
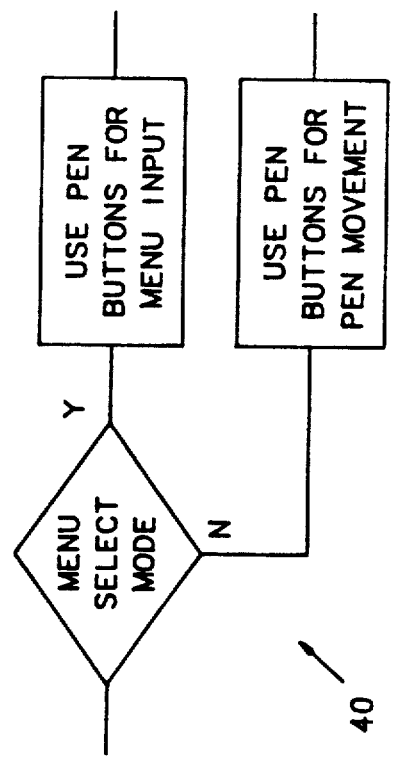
FIG. 6

SIMPLIFIED MENU INPUTTING FOR A PEN PLOTTER

BACKGROUND OF THE INVENTION

The present invention relates to pen plotters and, in particular, to a method and apparatus for simplifying the display and inputting of menu selection information. More specifically, it relates to simplified menu display and entry apparatus for changing the current operating parameter values in a pen plotter having random access memory (RAM) containing changeable current operating parameter values, a plotting mechanism, plotter logic for controlling the plotting mechanism, and a set of pen control buttons associated with up, down, left, and right movement of a pen of the pen plotter, wherein the apparatus comprises, alpha-numeric display means for displaying alpha-numeric characters to a user; a sensible ON LINE function button; a sensible MENU function button; menu function select mode logic means for sensing the ON LINE function button and the MENU function button, for placing the pen plotter in a menu selection mode when the MENU function button is pressed while the pen plotter is in a plotter control mode, and for placing the pen plotter in the plotter control mode when the ON LINE function button is pressed while the pen plotter is in the menu selection mode; read only memory (ROM) means containing menu definition means for defining a plurality of top-to-bottom and left-to-right alpha-numeric menu definitions to be displayed on the alpha-numeric display means to a user, the menu definitions being associated with respective ones of a plurality of functions and subfunctions of the pen plotter and operating parameters associated therewith, the menu definitions being in a two-dimensional form wherein top level menu definitions associated with major functions and parameters of the plotter are in one dimension while sub-functions portions of a top level menu definition is a second dimension of a menu definition matrix; and, menu input logic means for sensing the pen control buttons, for starting at top level ones of the plurality of menu definitions and displaying next and previous ones in order in response to sensing the pressing of up and down ones of the pen control buttons respectively, for starting at beginning ones of sub-function menu definition portions of selected ones of the plurality of menu definitions and displaying next and previous ones in order in response to sensing the pressing of right and left ones of the pen control buttons respectively, and for entering a parameter value associated with a displayed one of the plurality of menu definitions into the RAM containing the changeable current operating parameter values when the menu function select mode logic means is in the menu selection mode.

Pen plotters are popular peripheral devices for use with CAD systems and the like for providing graphics output, particularly at larger drawings sizes. They provide the advantage of professional quality drawings at a price which is much lower than other forms of graphics output devices.

Like most peripheral devices attached to computer (and some other contemporary stand-alone electronics devices like facsimile machines, etc.), pen plotters provide a user with the ability to set various operating parameters associated with the device from the device itself. Early devices sometimes accomplished this with so-called DIP switches that could be set, and some devices still employ DIP switches for some or all of their parameter setting functions. While DIP switches are adequate for setting things like BAUD rate in a modem or between pulse and tone dialing in a facsimile machine, and the like, which seldom if ever change, there are functions associated with some devices which may need to be changed more regularly to suit the needs of different users or of different projects employing the device.

In a device having an alpha-numeric display 10 as in FIG. 1, there is usually a set of menu/function buttons 12 associated with the display 10 which can be employed to perform menu and function selection through the display. The analog DIP switches in some cases have even been replaced with so-called "soft" switches which can be changed through the display 10 and buttons 12. The drawing of FIG. 1, however, is typical of the control panel 14 of a prior art pen plotter and, therefore, there are also pen direction control buttons 16 included with the panel 14. A functional block diagram for a prior art pen plotter 18 thus configured is shown in FIG. 2. The plotter 18 includes plotter logic 20 connected to control a plotting mechanism 22. The plotter logic 20, in turn, is connected to random access memory (RAM) 24, read only memory (ROM) 25, display 10, menu buttons 12, and the pen buttons 16.

A conventional configuration as in FIGS. 1 and 2 offers several disadvantages to a pen plotter offering many features and, therefore, many menu options. The cost of adding menu buttons 12 adds to the cost of the plotter. More important, however, the user has to remember how to use the various buttons 12 or refer to an operator's manual in order to find out. The result is that, like a vast number of modern devices offering many wonderful features from VCRs to CD players, the average high technology pen plotter user is either not interested in learning how to implement the functions or simply cannot figure out the process and, therefore, many of the features go unused. This phenomenon of modern electronics is characterized by the number of VCRs that are seen simply flashing 12:00 on the time display because their users can't or can't be bothered to program them.

Wherefore, it is the object of this invention to provide a method and apparatus for simplifying the display and inputting of menu selection information in a modern high technology pen plotter offering its users a large number of menu selections, options, and functions from which to choose.

Other objects and benefits of the invention will become apparent from the detailed description which follows hereinafter when taken in conjunction with the drawing figures which accompany it.

SUMMARY

The foregoing object has been achieved in a pen plotter having random access memory (RAM) containing changeable current operating parameter values, a plotting mechanism, plotter logic for controlling the plotting mechanism, and a set of pen control buttons associated with up, down, left, and right movement of a pen of the pen plotter, by the simplified menu display and entry apparatus of the present invention for changing the current operating parameter values comprising, alpha-numeric display means for displaying alpha-numeric characters to a user; a sensible ON LINE function button; a sensible MENU function button; menu function select mode logic means for sensing the ON LINE function button and the MENU function button, for placing the pen plotter in a menu selection mode when the MENU function button is pressed while the pen plotter is in a plotter control mode, and for placing the pen plotter in the plotter control mode when the ON LINE function button is pressed while the pen plotter is in the menu selection mode; read only memory (ROM) means containing menu definition means for defining a plurality of top-to-bottom and left-to-right alpha-numeric menu definitions to be displayed on the alpha-numeric display means to a user, the menu definitions being associated with respective ones of a plurality of functions and subfunctions of the pen plotter and operating parameters associated therewith, the menu definitions being in a two-dimensional form wherein top level menu definitions associated with major functions and parameters of the plotter are in one dimension while sub-function portions of a top level menu definition is a second dimension of a menu definition matrix; and, menu input logic means for sensing the pen control buttons, for starting at top level ones of the plurality of menu definitions and displaying next and previous ones in order in response to sensing the pressing of up and down ones of the pen control buttons respectively, for starting at beginning ones of sub-function menu definition portions of selected ones of the plurality of menu definitions and displaying next and previous ones in order in response to sensing the pressing of right and left ones of the pen control buttons respectively, and for entering a parameter value associated with a displayed one of the plurality of menu definitions into the RAM containing the changeable current operating parameter values when the menu function select mode logic means is in the menu selection mode.

In the preferred embodiment, the RAM contains a plurality of portions for holding changeable current operating parameter values associated with respective ones of a plurality of users; one of the plurality of top-to-bottom and left-to-right alpha-numeric menu definitions is associated with a process for identifying a user of the plotter as a prior user and setting a current operating parameter value in the RAM to indicate a current user identification number; and, the plotter logic for controlling the plotting mechanism includes logic for using the current user identification number as a pointer to a one of the plurality of portions holding changeable current operating parameter values to be used for a current user.

DESCRIPTION OF THE DRAWINGS

FIG. 1 is simplified drawing of portions of a control panel of a pen plotter according to the prior art showing a typical approach to the display and inputting of menu selection information.

FIG. 2 is a functional block diagram of the components of the pen plotter of FIG. 1 involved in displaying and inputting menu selection information.

FIG. 3 is simplified drawing of portions of a control panel of a pen plotter according to the present invention for displaying and inputting menu selection information.

FIG. 4 is a functional block diagram in the manner of FIG. 2 of the components of the pen plotter of FIG. 3 involved in displaying and inputting menu selection information according to the present invention.

FIG. 5 is a more detailed functional block diagram of the RAM and PLOTTER LOGIC blocks of FIG. 4.

FIG. 6 is a top-level flowchart of the PLOTTER LOGIC block of FIGS. 4 and 5.

DESCRIPTION OF THE PREFERRED EMBODIMENT

A pen plotter control panel 14' according to the present invention is shown in FIG. 3 and the corresponding functional block diagram for the plotter 18' is shown in FIG. 4. Like components to the prior art approach of FIGS. 1 and 2 and shown with like numbers. The first thing that will be apparent is that the menu buttons 12 of the prior art are completely missing. In a pen plotter 18' according to this invention, the menu interface is accomplished by using the pen buttons 16 in a dual-function capacity. The only other buttons on the control panel 14' are an ON LINE button 26 and a MENU button 28.

As best seen from the drawing of FIG. 5 the ROM 25' includes a menu definitions portion 30 and the RAM 24' includes a current parameters portion 32 which is subdivided into entries 34 for users identified as 1 through "n". An important aspect of the present invention is that not only is the menu inputting procedure simplified and made tutorial in nature; but additionally, once a user has input current parameters, he or she can return to the plotter 18' and use the same parameters without need to re-enter them despite the plotter 18' having been used by others in the mean time.

The plotter logic 20' in this invention is divided into a menu input logic portion 36 and a plotter driving logic portion 38. The plotter driving portion 38 is conventional and no further mention will be made thereof except to note that an index into the current parameters portion 32 of the RAM 24' will have to be provided to the plotter driving portion 38 so that it can pick up its current operating parameters from the entry 34 of the current user. As indicated by the arrows in FIG. 5. The menu input logic portion 36 uses the pre-defined menu definitions 30 to present menu displays on the display 10 to users in a manner to be described shortly. The parameters obtained from the users are stored into the entries 34 of the current parameters portion 32 which, as mentioned above, are used by the plotter driving logic 38. Within the plotter logic 20', the pen button selection logic 40 of FIG. 7 is included. The logic 40 first determines if the plotter logic 20 is working in a menu select mode or in the plotter control mode. If it is in a menu select mode, the pen buttons 16 are used for menu input in the manner to be described shortly. If it is in the plotter control mode, the pen buttons 16 are used in their usual manner to control the position of the pen of the plotter 18'. The mode of the plotter 18' and the plotter logic 20' is determined by the user through the use of the ON LINE and MENU buttons 26, 28. When the ON LINE button 26 is pressed, the plotter logic 20' is placed in the plotter control mode. When the MENU button 28 is pressed, the plotter logic 20' is placed in the menu select mode as will now be described in detail so as to better understand the construction and operation of the present invention. As those skilled in the art will readily recognize and appreciate, the example with follows is representative only and those implementing the present invention within a pen plotter will undoubtedly wish to made the menu entries in particular according their own objectives and to fit in with the features being offered by the pen plotter with which it is being associated. Such should not diminish the breadth to be accorded the appended claim, which should be in keeping with the scope and spirit of the invention being described herein. Also, those skilled in the art will readily recognize how to implement the features being described within the logic and microprocessors employed in their various pen plotter and, therefore, in the interest of simplicity and the avoidance of redundancy, no attempt will be made herein to describe any actual implementation coding or logic flowcharts to such level.

As will be noted, the pen buttons 16 comprise four buttons 42 through 48 comprising an UP button 42, a DOWN button 44, a RIGHT button 46, and a LEFT button 48. In the plotter control mode, the buttons 42 through 48 are used to move the pen position up, down, right, and left. In the menu select mode according to the manner of operation of the present invention, they serve a similar function with respect to the menu entries and are, therefore, very apparent in their purpose to the users. For such purpose, the menu definitions within the menu definitions portion 30 of the ROM 25' are laid out in a top-to-bottom and left-to-right two-dimensional form for display in that fashion under the control of the buttons 42 through 48. In other words, top level menu definitions associated with major functions and parameters of the plotter 18' are in one dimension referred to herein for convenience as "up" and "down" while the accessing of sub-function portions of each top level menu entry is done on a "left" to "right" basis in the second dimension of the menu definition matrix. When the MENU button 28 is pressed by a user, it places the plotter logic 20' in the menu select mode for purposes of the logic 40 of FIG. 7. Upon initial entry to the menu select mode, the menu input logic 36 starts at the top of the menu definitions within the menu definitions portion 30 of the ROM 25' and displays the first entry. Most typically, this would be to identify the current user. Thus the display of a menu entry such as IDENTIFY CURRENT USER? would be appropriate. After the MENU button 28 is pressed by a user to place the plotter 18' in the menu select mode, it is not pressed again unitl the user desires to exit the menu select mode. The buttons 42 through 48 are used to move from top-to-bottom and from left-to-right within the menus until desired items are reached for entry. Thus, with the IDENTIFY CURRENT USER? entry displayed a user starting to use the plotter 18' would answer "yes" to the request. The menu input logic portion 36 would then stay within the current user identification menu and would go to the next entry by displaying, for example, PRIOR USER=YES. This would indicate that the user about to use the plotter 18' had used it before and his/her current parameters were already entered. The user would move to the next option within the current menu item display (i.e. to the "right" according to the convention being employed herein) by pressing the RIGHT button 46. Moving back to a previous entry would, of course, be accomplished by employing the LEFT button 48. The menu input logic portion 36 might next display PRIOR USER=NO. The first time user (or user desiring to change current parameters) would select this entry. Since the menu input logic portion 36 is still in the first menu entry set, it would then continue down the menu definition in the portion thereof for inputting parameters for a new (or changing) user by, for example, displaying CURRENT USER=#1. The user would use the RIGHT and LEFT buttons 46, 48 to display the proper selection and then select it.

The foregoing process would be repeated until all the selections for the first or top menu portion of the menu definitions had been completed. At that time, the menu input logic portion 36 would display the first display item for the next major menu portion and the above-described process would be repeated with the user skipping or moving through a particular menu area by employing the RIGHT and LEFT buttons 46, 48 and the MENU button 28 according to their functions as described above. The menu displays would, of course, be determined by the functions of the pen plotter 18' provided and for which changeable parameters are needed.

As those skilled in the art will readily recognize and appreciate, the foregoing method of menu inputting is completely tutorial to the user and does not require constant reference to any operating instructions. The menu input logic portion 36 will stay in control of the plotter 18' until such time as the ON LINE button 26 is pressed. Expanded capability for moving through the various menus for those more skilled in the operation of the plotter 18' could be provided by combining use of the ON LINE button 26 with the MENU button 28. By recognizing that the MENU button 28 was being held in a depressed state, the menu input logic portion 36 could then look to simultaneous pressing of the ON LINE button 26 as indicating further user selection options.

As those skilled in the art will undoubtedly have noticed, the system of this invention also recognizes a user returning to use the plotter 18' once again and simply resumes employing the prior input parameters of the user once the user identifies himself or herself to the logic 20' as described above.

Thus, it can be seen that the present invention has truly met its stated objective by providing a menu inputting capability for a pen plotter which is simple and tutorial in nature.

Wherefore, having thus described the present invention, what is claimed is:

1. In a pen plotter having random access memory (RAM) containing changeable current operating parameter values, a plotting mechanism, plotter logic for controlling the plotting mechanism, and a set of pen control buttons associated with up, down, left, and right movement of a pen of the pen plotter, simplified menu display and entry apparatus for changing the current operating parameter values comprising:
   a) alpha-numeric display means for displaying alpha-numeric characters to a user;
   b) a sensible ON LINE function button;
   c) a sensible MENU function button;
   d) menu function select mode logic means for sensing said ON LINE function button and said MENU function button, for placing the pen plotter in a menu selection mode when said MENU function button is pressed while the pen plotter is in a plotter control mode, and for placing the pen plotter in said plotter control mode when said ON LINE function button is pressed while the pen plotter is in said menu selection mode;
   e) read only memory (ROM) means containing menu definition means for defining a plurality of top-to-bottom and left-to-right alpha-numeric menu definitions to be displayed on said alpha-numeric display means to a user, said menu definitions being associated with respective ones of a plurality of functions and subfunctions of the pen plotter and operating parameters associated therewith, said menu definitions being in a two-dimensional form wherein top level menu definitions associated with major functions and parameters of the plotter are in one dimension while sub-function portions of a top level menu definition is a second dimension of a menu definition matrix; and, f) menu input logic means for sensing the pen control buttons, for starting at top level ones of said plurality of menu definitions and displaying next and previous ones in order in response to sensing the pressing of up and down ones of the pen control buttons respectively, for starting at beginning ones of sub-function menu definition portions of selected ones of said plurality of menu definitions and displaying next and previous ones in order in response to sensing the pressing of right and left ones of the pen control buttons respectively, and for entering a parameter value associated with a displayed one of said plurality of menu definitions into the RAM containing the changeable current operating parameter values when menu function select mode logic means is in said menu selection mode.

2. The simplified menu display and entry apparatus for a pen plotter of claim 1 wherein:
 a) the RAM contains a plurality of portions for holding changeable current operating parameter values associated with respective ones of a plurality of users;
 b) one of said plurality of top-to-bottom and left-to-right alpha-numeric menu definitions is associated with a process for identifying a user of the plotter as a prior user and setting a current operating parameter value in the RAM to indicate a current user identification number; and,
 c) the plotter logic for controlling the plotting mechanism includes logic for using said current user identification number as a pointer to a one of said plurality of portions holding changeable current operating parameter values to be used for a current user.

3. Simplified menu display and entry apparatus for changing the current operating parameter values in a pen plotter having random access memory (RAM) containing changeable current operating parameter values, a plotting mechanism, plotter logic for controlling the plotting mechanism, and a set of pen control buttons associated with up, down, left, and right movement of a pen of the pen plotter, said apparatus comprising:
 a) alpha-numeric display means for displaying alpha-numeric characters to a user;
 b) a sensible ON LINE function button;
 c) a sensible MENU function button;
 d) menu function select mode logic means for sensing said ON LINE function button and said MENU function button, for placing the pen plotter in a menu selection mode when said MENU function button is pressed while the pen plotter is in a plotter control mode, and for placing the pen plotter in said plotter control mode when said ON LINE function button is pressed while the pen plotter is in said menu selection mode;
 e) read only memory (ROM) means containing menu definition means for defining a plurality of top-to-bottom and left-to-right alpha-numeric menu definitions to be displayed on said alpha-numeric display means to a user, said menu definitions being associated with respective ones of a plurality of functions and subfunctions of the pen plotter and operating parameters associated therewith, said menu definitions being in a two-dimensional form wherein top level menu definitions associated with major functions and parameters of the plotter are in one dimension while sub-function portions of a top level menu definition is a second dimension of a menu definition matrix; and, f) menu input logic means for sensing the pen control buttons, for starting at top level ones of said plurality of menu definitions and displaying next and previous ones in order in response to sensing the pressing of up and down ones of the pen control buttons respectively, for starting at beginning ones of sub-function menu definition portions of selected ones of said plurality of menu definitions and displaying next and previous ones in order in response to sensing the pressing of right and left ones of the pen control buttons respectively, and for entering a parameter value associated with a displayed one of said plurality of menu definitions into the RAM containing the changeable current operating parameter values when said menu function select mode logic means is in said menu selection mode.

4. The simplified menu display and entry apparatus for a pen plotter of claim 3 wherein:
 a) the RAM contains a plurality of portions for holding changeable current operating parameter values associated with respective ones of a plurality of users;
 b) one of said plurality of top-to-bottom and left-to-right alpha-numeric menu definitions is associated with a process for identifying a user of the plotter as a prior user and setting a current operating parameter value in the RAM to indicate a current user identification number; and.
 c) the plotter logic for controlling the plotting mechanism includes logic for using said current user identification number as a pointer to a one of said plurality of portions holding changeable current operating parameter values to be used for a current user.

5. A pen plotter including simplified menu display and entry apparatus for changing current operating parameter values comprising:
 a) a random access memory (RAM) containing changeable current operating parameter values;
 b) a plotting mechanism;
 c) plotter logic for controlling said plotting mechanism;
 d) a set of pen control buttons associated with up, down, left, and right movement of a pen of the pen plotter;
 e) alpha-numeric display means for displaying alpha-numeric characters to a user;
 f) a sensible ON LINE function button;
 g) a sensible MENU function button;
 h) menu function select mode logic means for sensing said ON LINE function button and said MENU function button, for placing the pen plotter in a menu selection mode when said MENU function button is pressed while the pen plotter is in a plotter control mode, and for placing the pen plotter in said plotter control mode when said ON LINE function button is pressed while the pen plotter is in said menu selection mode;
 i) read only memory (ROM) means containing menu definition means for defining a plurality of top-to-bottom and left-to-right alpha-numeric menu definitions to be displayed on said alpha-numeric display means to a user, said menu definitions being associated with respective ones of a plurality of functions and subfunctions of the pen plotter and operating parameters associated therewith, said menu definitions being in a two-dimensional form wherein top level menu definitions associated with major functions and parameters of said plotter are in one dimension while sub-function portions of a top level menu definition is a second dimension of a menu definition matrix; and, j) menu input logic means for sensing the pen control buttons, for starting at top level ones of said plurality of menu definitions and displaying next and previous ones in order in response to sensing said pressing of up and down ones of the pen control buttons respectively, for starting at beginning ones of sub-function menu definition portions of selected ones of said plurality of menu definitions and displaying next and previous ones in order in response to sensing said pressing of right and left ones of the pen control buttons respectively, and for entering a parameter value associated with a displayed one of said plurality of menu definitions into said RAM containing said changeable current operating parameter values when said menu function select mode logic means is in said menu selection mode.

6. The pen plotter of claim 5 wherein:

a) said RAM contains a plurality of portions for holding changeable current operating parameter values associated with respective ones of a plurality of users;

b) one of said plurality of top-to-bottom and left-to-right alpha-numeric menu definitions is associated with a process for identifying a user of said plotter as a prior user and setting a current operating parameter value in said RAM to indicate a current user identification number; and, c) said plotter logic for controlling said plotting mechanism includes logic for using said current user identification number as a pointer to a one of said plurality of portions holding changeable current operating parameter values to be used for a current user.

* * * * *